(12) United States Patent
Bowers, II et al.

(10) Patent No.: US 10,056,905 B1
(45) Date of Patent: Aug. 21, 2018

(54) NANOMATERIAL-BASED PHYSICALLY UNCLONABLE FUNCTION DEVICE

(71) Applicant: BAE Systems Information and Electronic Systems Integration Inc, Nashua, NH (US)

(72) Inventors: Michael J. Bowers, II, Sykesville, MD (US); Pierre-Alain S. Auroux, Rockville, MD (US); Thomas E. Collins, III, Tyngsboro, MA (US); James A. Stobie, Westford, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 15/663,359

(22) Filed: Jul. 28, 2017

(51) Int. Cl.
*H03K 19/00* (2006.01)
*H03K 19/003* (2006.01)
*H04L 9/32* (2006.01)

(52) U.S. Cl.
CPC ......... *H03K 19/003* (2013.01); *H04L 9/3278* (2013.01)

(58) Field of Classification Search
CPC ............................ H03K 19/003; H04L 9/3278
USPC ............................................................. 326/8
See application file for complete search history.

(56) References Cited

U.S. PATENT DOCUMENTS

| 2013/0141137 | A1* | 6/2013 | Krutzik | ............... | H03K 19/173 |
| | | | | | 326/8 |
| 2017/0134174 | A1* | 5/2017 | Cambou | ............... | G02B 1/002 |
| 2017/0271551 | A1* | 9/2017 | Kim | ................... | H01L 33/06 |

FOREIGN PATENT DOCUMENTS

WO  2012038842 A1  3/2012

OTHER PUBLICATIONS

Roberts et al., "Using Quantum Confinement to Uniquely Identify Devices", Scientific Reports, www.nature.com/scientificreports, published Nov. 10, 2015, 5:16456 | DOI: 10.1038/srep16456, 8 pages.

P. Tuyls et al., "Read-Proof Hardware from Protective Coatings", Workshop on Cryptographic Hardware and Embedded Systems 2006 (CHES 2006), Oct. 10-Oct. 13, 2006, pp. 369-383, International Association for Cryptologic Research 2006, Yokohama, Japan.

* cited by examiner

*Primary Examiner* — Don Le
(74) *Attorney, Agent, or Firm* — Finch & Maloney PLLC; Scott J. Asmus

(57) ABSTRACT

Techniques are provided for a physically unclonable function (PUF) device. One example PUF device includes, a readout integrated circuit (ROIC) (such as a ROIC for a focal plane array or other imaging application), a nanomaterial-based PUF layer on the ROIC, and a common electrode on the PUF layer. The nanomaterial is randomly distributed throughout the PUF layer. A method of using a PUF device that includes a nanomaterial-based PUF layer coupled to a ROIC, where the nanomaterial is randomly distributed throughout the PUF layer, includes driving the ROIC at a plurality of locations coupled to a corresponding plurality of locations of the PUF layer, sensing the nanomaterial at the locations of the PUF layer, and generating a unique identification key from the sensed locations of the PUF layer. The method can be used, for example, for secure decryption or for identifying or authenticating the PUF device.

17 Claims, 10 Drawing Sheets

NANOMATERIAL-BASED PHYSICALLY UNCLONABLE FUNCTION DEVICE

FIELD OF THE DISCLOSURE

This disclosure relates to a nanomaterial-based physically unclonable function device.

BACKGROUND

Physically unclonable functions (PUFs) can be used to combat hardware tampering, such as from counterfeit parts and components, as well as for identification and encryption. For example, the addition of a PUF device is one way to ensure that chips or larger assemblies have not been tampered with or had components substituted.

BRIEF DESCRIPTION OF THE DRAWINGS

Features of embodiments of the claimed subject matter will become apparent as the following Detailed Description proceeds, and upon reference to the Drawings, wherein like numerals depict like parts.

Figure 1:
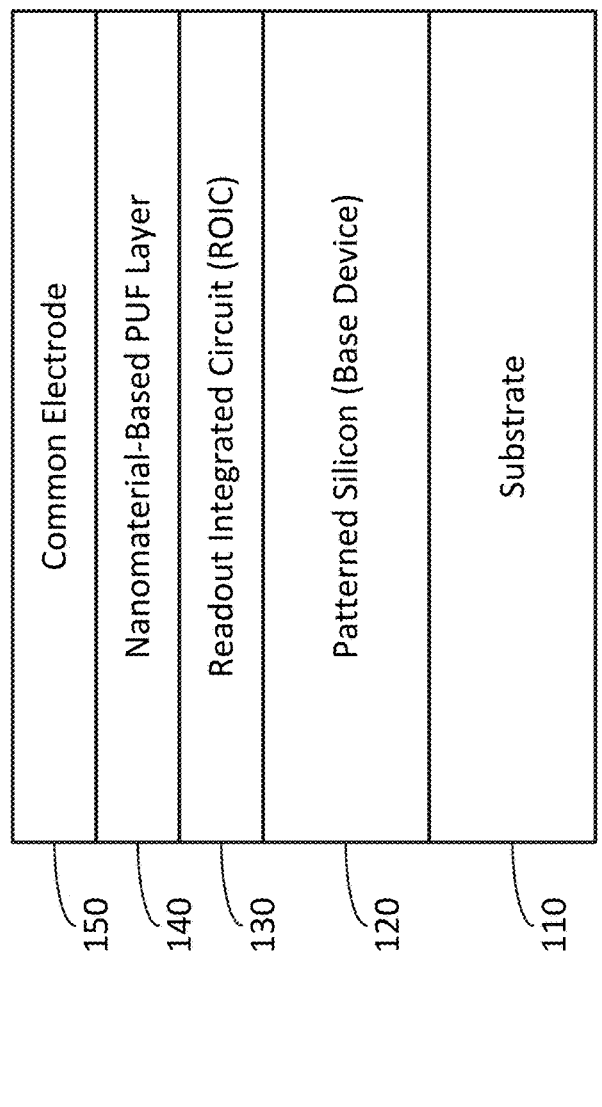
FIG. 1 is a cross-sectional view of an example nanomaterial-based physically unclonable function (PUF) device according to an embodiment of the present disclosure.

Although the following Detailed Description will proceed with reference being made to illustrative embodiments, many alternatives, modifications, and variations thereof will be apparent to those in light of the present disclosure.

DETAILED DESCRIPTION

Physically unclonable functions (PUFs) rely on randomness in the material (such as inherent or introduced) to provide a mode of identification, authentication, secure encryption, and the like. Mapping this randomness leads to unique identifying signatures that can be used for a multitude of purposes including encryption and identification. According to an embodiment of the present disclosure, a PUF device is generated by three-dimensional (3D) mapping of the distribution of quantum dots (QDs) or other nanoscale material (e.g., nanomaterial) in a polymer matrix via electrical (such as capacitance, resistance, impedance, and the like) measurements.

Effects such as aggregation and phase segregation of nanomaterials in thin films has been a hindrance to the development of nanocomposite photonics and photovoltaics. The aggregates create inhomogeneous areas in films that tend to limit the viable size of devices due to the unwanted effects on the electronic properties. However, various embodiments of the present disclosure exploit this phenomenon by generating a PUF device that uses very little processing and is compatible with standard semiconductor processes such as complementary metal oxide semiconductor (CMOS) processes and components.

General Overview

According to an embodiment of the present disclosure, a PUF layer is a mixture of semiconductor QDs and a polymer matrix that is spin cast or drop cast onto a surface (such as a readout integrated circuit surface) followed by curing and deposition of a counter electrode (e.g., aluminum). An array or matrix of capacitors (or resistors or other electrical circuits) is generated by sandwiching the nanomaterial composite layer between a readout integrated circuit (ROIC) and a metal electrode (such as the counter electrode). For ease of description, the PUF layer will be described primarily throughout as a set of capacitors (in a dielectric polymer matrix), but the present disclosure is not limited thereto. In some other embodiments, the PUF layer is a set of resistors (e.g., in a conductive polymer matrix) or other electrical circuits, as will be apparent in light of the present disclosure. In some embodiments, the PUF layer serves as a multifunctional layer, such as an image sensor (e.g., infrared (IR) sensor, including a short wavelength IR (SWIR) sensor or a near IR (NIR) sensor, or a visible light sensor). For example, the electrical array of sensors can also be used to drive an array of pixels in a multifunctional PUF layer.

As the capacitance between the ROIC and the counter electrode is related to the dielectric constant of the material between the plates (electrodes) the spatial distribution of the QDs (aggregates) will cause a random distribution of capacitance values over the array. The capacitor values can be mapped using the ROIC and used to generate a unique signature (3D-map) for the PUF device, such as a location (x- and y-axes) and signal intensity (z-axis) at distinct points of the array.

The capacitors can be probed in many ways, such as individually, in patterns (e.g., predetermined patterns), vertically (such as in columns or between rows), horizontally (such as in rows or between columns), and the like, to provide additional dimensions of data to form a more complex fingerprint for the device. The random inhomogeneity can come from several sources, including the degree of aggregation (such as the size distribution of the aggregates), the deposition processes (which, for example, can lead to different spatial distributions), and the composition of the films, to name a few.

The degree of aggregation of the QDs in the PUF layer can be controlled by various factors such as the surface chemistry and the post synthetic processing of the QDs as well as the host polymer matrix. QDs can be synthesized with a passivation ligand present that acts as a capping ligand. These can be, for example, surfactants or fatty acid molecules that stabilize the QDs and render them soluble. As such this capping ligand can also dictate the solubility properties of the QDs. The capping ligand may include, for example, trioctylphosphine oxide (TOPO).

Nevertheless, aggregation may take place when the QDs stick together as the capping ligands intercalate between one another, resulting in a lower energy conformation. This process can be further driven by, for example, a post synthetic isolation process such as crash precipitation. In one embodiment, a solvent is added, forcing the QDs to aggregate so they can be separated from the reaction byproducts.

The deposition process can be tailored to produce maximum inhomogeneity. In some embodiments, this is accomplished by less rigorous filtration and mixing steps leading to the desired aggregated nanomaterials in solution. Then, when the QDs are dispersed in a planarizing coating, aggregates of a variety of shapes and sizes are created spanning more than two orders of magnitude (e.g., more than a hundred-fold) in size. The relative density of the aggregates can be controlled by dilution of the QDs with more of the coating material.

The deposition methods (such as spin casting or drop casting) provide relatively uniform films; however, small variability can be expected due to the standard variation in reproducing multiple samples. In addition, processes like spin casting can produce a light ripple pattern from the spinning motion that can add to the inhomogeneity of the system.

Curing conditions can also play a role in the microstructure of the films. In some embodiments, curing techniques such as vacuum curing and curing at one or more temperatures (as selected from, for example, a variety of temperatures tested) are used to boost inhomogeneity of the system.

According to some embodiments of the present disclosure, semiconductor QDs, such as QDs made from cadmium selenide (CdSe), are used as the medium to introduce the inhomogeneity. For ease of description, CdSe is primarily used throughout as an example semiconductor QD material. However, other embodiments are not so limited. For example, in some embodiments, other semiconductor QDs are used, such as group II-VI semiconductor (in addition to CdSe, e.g., cadmium sulfide (CdS), zinc sulfide (ZnS), zinc selenide (ZnSe), mercury telluride (HgTe), and the like), group III-V semiconductor (e.g., indium phosphide (InP), gallium arsenide (GaAs), to name a few), or group IV-VI semiconductor (e.g., lead sulfide (PbS), lead selenide (PbSe), lead telluride (PbTe), and the like).

In some other embodiments, further nanomaterial options are used in place of, or in addition to, the semiconductor QDs. These can include metal nanoparticles, carbon nanotubes, or nanoparticles of dielectric materials such as zinc oxide (ZnO), to name a few. This is because the surface properties of these materials can be manipulated in the same or similar fashion as the semiconductor QDs, and a similar behavior can be expected. In still other embodiments, adding a different material into the mixture provides another dimension of inhomogeneity. Further, in some embodiments, changing the nanoparticle additive composition provides an extra tuning parameter for producing a PUF device These and other embodiments of the present disclosure introduce randomness into the PUFs better than with other techniques. For example, in general, there are two ways of introducing randomness into PUFs: intrinsically and explicitly. Intrinsic PUFs can include, for example, tool markings or other irregularities that are introduced (e.g., unintentionally) during the manufacturing process. However, these can limit the functionality and make probing for confirmation more difficult.

Explicit PUFs, on the other hand, can be introduced intentionally into a system for the purpose of providing a PUF. In most other techniques, these explicit PUFs are optically verified. However, according to one or more embodiments of the present disclosure, an explicit PUF is provided that can be read out electronically in a cryptological fashion (e.g., a simple electrical measurement can quickly determine if the component is giving the correct expected response based on the pre-deployment generation of a key, such as a unique identification key based on the unique capacitance array of the PUF). In some embodiments, if further determination is desired, optical or electron microscopy can be used to cross correlate (e.g., in case of a failure in the electrical read out).

Architecture and Methodology

FIG. 1 is a cross-sectional view of an example nanomaterial-based physically unclonable function (PUF) device 100 according to an embodiment of the present disclosure. The PUF device 100 can be formed, for example, as part of a semiconductor fabrication process, such as a CMOS process. The PUF device 100 can be a device stack that includes the PUF.

The PUF device 100 includes a base device 120 on a substrate 110. The substrate may be made, for example, of silicon. The base device 120 can be an integrated circuit (IC), such as a microprocessor or custom logic circuit produced as part of the semiconductor fabrication process. The base device 120 can include features (e.g., transistors) made from silicon, such as in the front end of line (FEOL) of the CMOS process, interconnected by metal layers of the back end of line (BEOL) of the CMOS process. The PUF device 100 further includes a readout integrated circuit (ROIC) 130, such as a ROIC for a focal plane array or other imaging application, on the base device 120. The ROIC 130 reads detectors, in this case capacitance detectors, formed in (for example) an array shaped structure, the array being parallel to the substrate (e.g., in the x- and y-dimensions), and capable of reading capacitances formed perpendicular to the substrate (e.g., in the z-dimension). The ROIC 130 or base device 110 can include drivers, input or output taps, and other circuits for driving the array of detectors, identifying or authenticating the PUF device 100, performing secure decryption, and the like. In some embodiments, the ROIC 130 is part of or in the base device 120 (and, for example, is made from silicon and metal layers of the FEOL and BEOL).

The PUF device 100 further includes a nanomaterial-based PUF layer 140 on the ROIC 130. The nanomaterial can be in a polymer matrix and randomly distributed throughout the PUF layer. The PUF layer 140 can include, for example, nanomaterial-based quantum dots (QDs), such as semiconductor QDs, formed by spin casting or drop casting, and aggregated in a somewhat random (and, for all practical purposes, unreproducible) arrangement to produce different measurable vertical capacitances when measured at different locations with the ROIC 130. For example, the QDs may include cadmium selenide (CdSe) formed as nanoparticles with sizes below 10 nanometers (nm) in their longest dimension. The CdSe may form a core of a nanocrystal semiconductor together with a ligand shell (e.g., TOPO) to make up the quantum dot. The PUF device 100 further includes a common (or counter) electrode 150 on the PUF layer 140 that works in conjunction with the ROIC 130 to form capacitances through different portions of the PUF layer 140. The random aggregation of the QDs in the PUF layer 140 causes different (and randomly arranged) capacitances to be read out by the ROIC 130 at different locations of the PUF layer 140.

The common electrode 150 can be made of one or more of a variety of materials. For example, in one embodiment, a metal (such as aluminum) is used to form the common electrode 150. In another embodiment, a conductive polymer, such as a polythiophene (e.g., poly(3-hexylthiophene) or simply P3HT), is used to form the common electrode. In still another embodiment, a conductive metal oxide, such as indium doped tin oxide (ITO), is used to form the common electrode.

The ROIC 130 can be configured to sense the nanomaterial at a plurality of locations of the PUF layer 140, the locations having corresponding random concentrations of the nanomaterial in a thickness direction (e.g., z-direction) of the PUF layer 140. The ROIC 130 can be further configured to generate a unique identification key (e.g., a number, a string of digits or other characters, a vector of such quantities, or the like) from the sensing of the nanomaterial at the locations. The ROIC 130 (or base device 120) can further include an input channel to receive a challenge (e.g., string of digits or other characters) and an output channel to supply a corresponding unique response (e.g., corresponding unique string of digits or other characters) to the challenge based on the unique identification key.

In some embodiments, the ROIC 130 is further configured to sense corresponding capacitances of the locations formed between the ROIC 130 and the common electrode 150, the sensed capacitances being randomly distributed among the locations. In one or more such embodiments, the ROIC 130 includes rows and columns of sense electrodes crossing each other at positions corresponding to the locations of the PUF layer 140, and a parallel analog-to-digital converter (ADC) configured to concurrently convert all the nanomaterial sensings corresponding to one of the rows or one of the columns.

The PUF device 100 can be constructed using no specialized tooling or modifications to standard CMOS protocols. For example, standard CMOS can process final vias through the passivation layer to access the last (e.g., highest) metal, which can act as sense nodes for the PUF elements. The PUF layer can be, for example, spin cast or drop cast onto the surface followed by curing and deposition of a counter electrode (such as aluminum).

Figure 2:
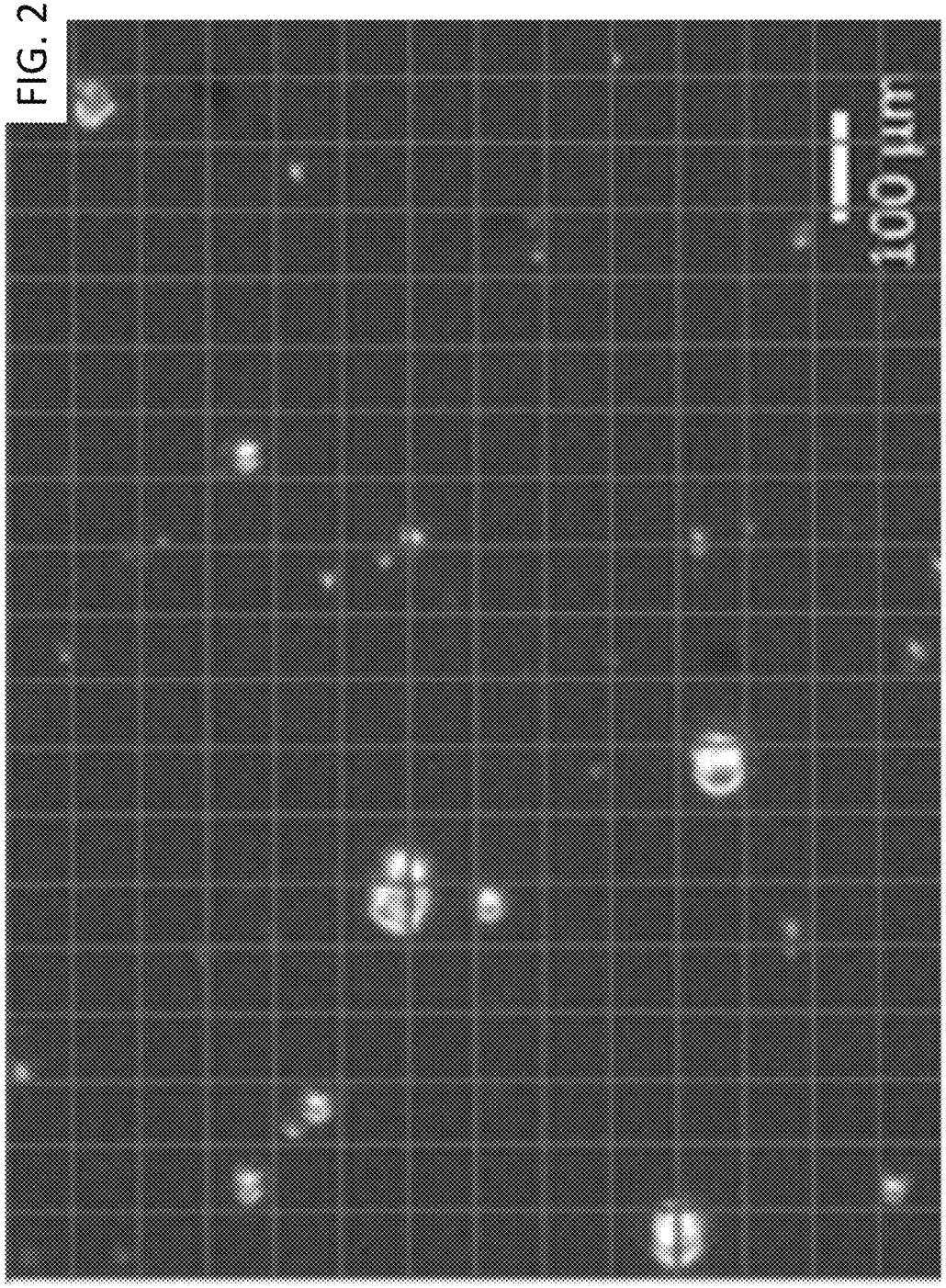
FIG. 2 is a top-down notional view of an example PUF device, which includes a nanomaterial composite layer disposed between a readout integrated circuit (ROIC) and a metal electrode so as to provide an array of capacitors, according to an embodiment of the present disclosure.

FIG. 2 is a top-down notional view of an example PUF device, which includes a nanomaterial composite layer disposed between a readout integrated circuit (ROIC) and a metal electrode so as to provide an array of capacitors, according to an embodiment of the present disclosure. In FIG. 2, the PUF layer forms a pattern of random aggregates of QDs with corresponding different capacitances. In the example embodiment shown, the aggregates are relatively small, the largest being about 70 micrometers (μm) in their longest dimension and most being less than (and some being far less than) 10 μm. Superimposed on the PUF layer view is an ROIC capacitance sensor array, with x- and y-electrodes spaced apart by about 60-65 μm in each of the x- and y-dimensions. Accordingly, some of the crossings of the x- and y-electrodes (capacitance measurement points) correspond to large aggregates, some to small aggregates, and some to no aggregates, all of which will produce different measured capacitances. The size and pattern of the aggregates (and their corresponding distinct capacitances) is so random, irregular, and small as to not be reproducible by known techniques.

In the example PUF device of FIG. 2, an array or matrix of capacitors is generated by sandwiching the nanomaterial composite layer (such as QDs in a dielectric polymer matrix) between a silicon (or silicon and metal interconnect) ROIC and a metal (e.g., top or common) electrode. As the capacitance is related to the dielectric constant of the material between the plates (electrodes) the spatial distribution of the QDs (aggregates) causes a random distribution of capacitance values over the array. In other embodiments, a conductive polymer matrix can be used, with the QDs (aggregates, possibly doped to enhance conductivity of the polymer matrix) imparting a random distribution of resistance (or impedance) values over the array. The resistances or impedances can then be read in a manner similar to reading capacitances with a dielectric polymer matrix, producing a different random distribution of measurements that are not recreatable with existing technology.

Figure 3:
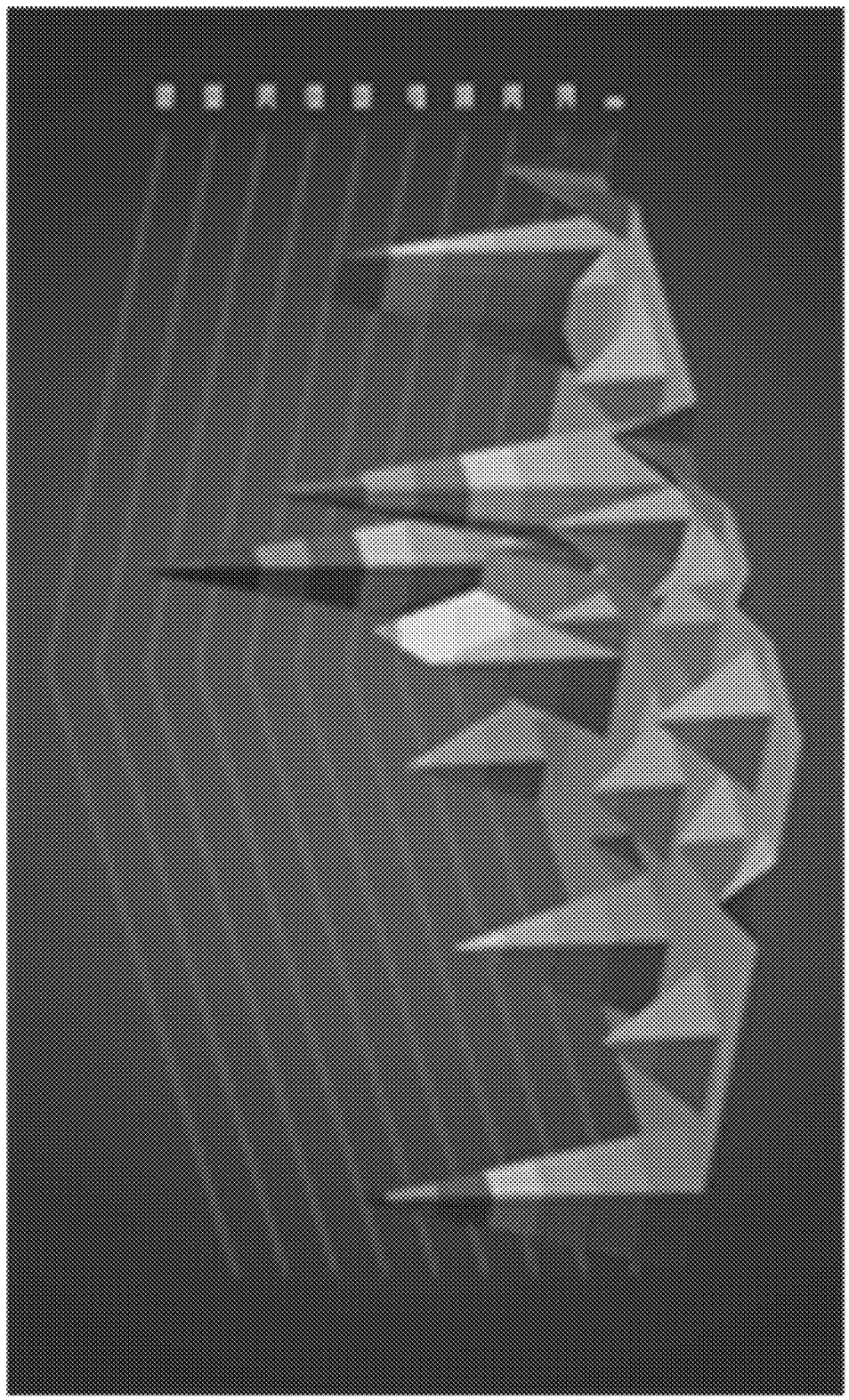
FIG. 3 is an oblique view of an example three-dimensional (3D) graph of locations of a ROIC capacitance sensor array (x- and y-dimensions) and corresponding capacitances (z-dimension) formed at these locations by a PUF device according to an embodiment of the present disclosure.

FIG. 3 is an oblique view of an example three-dimensional (3D) graph of locations of a ROIC capacitance sensor array (x- and y-dimensions) and corresponding capacitances (z-dimension) formed at these locations by a PUF device according to an embodiment of the present disclosure. The magnitude of the capacitances (z-dimension) is illustrated with segmented square pyramids of different corresponding heights (adjacent such pyramids sometimes merging into one pyramid-like structure). The pattern of capacitances is highly random and can be used to produce identifying numbers or sequences, cryptographic keys, and the like, that are unique to this particular PUF layer and not reproducible in other PUF layers.

In further detail, the capacitor values can be mapped out and used to generate a unique signature (3D-map or identification key) for the device including a location (x- and y-dimensions) and signal intensity (z-dimension). The capacitors may be probed, for example, individually, in patterns (such as predetermined patterns), by columns, or by rows, to provide additional dimensions of data to form a more complex fingerprint for the device.

Figure 4:
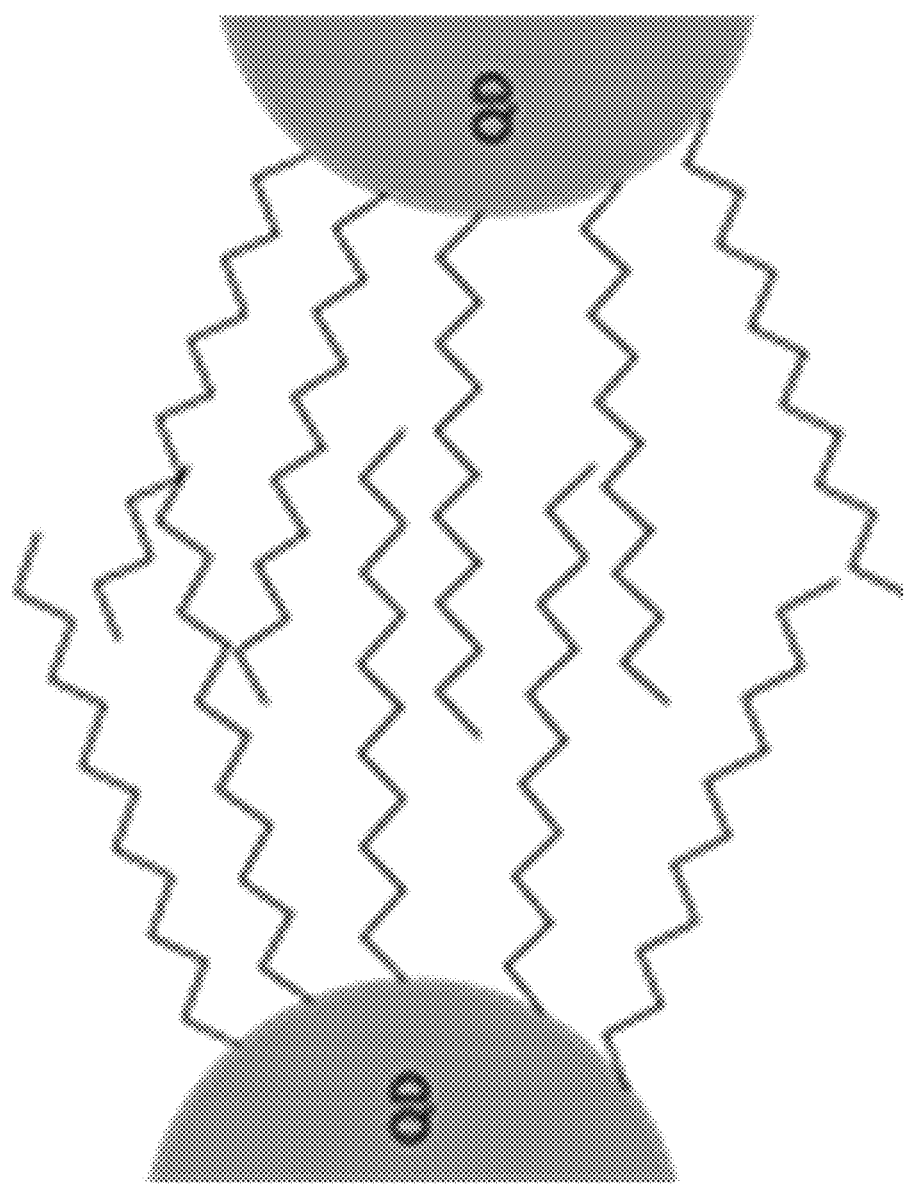
FIG. 4 is a schematic illustration of the interaction of Van der Waals force between adjacent quantum dots (QDs) within a nanomaterial composite layer, according to an embodiment of the present disclosure.

FIG. 4 is a schematic illustration of the interaction of Van der Waals force between adjacent quantum dots (QDs) within a nanomaterial composite layer, according to an embodiment of the present disclosure. As mentioned earlier, the QDs can include capping ligands that affect the quantum dot (QD) aggregation mechanism. As shown in FIG. 4, aggregation between two QDs may take place when the QDs stick together as the capping ligands intercalate between one another, resulting in a lower energy conformation. The ligands are held together through Van der Waals interactions, causing the nanomaterials to aggregate.

Figure 5:
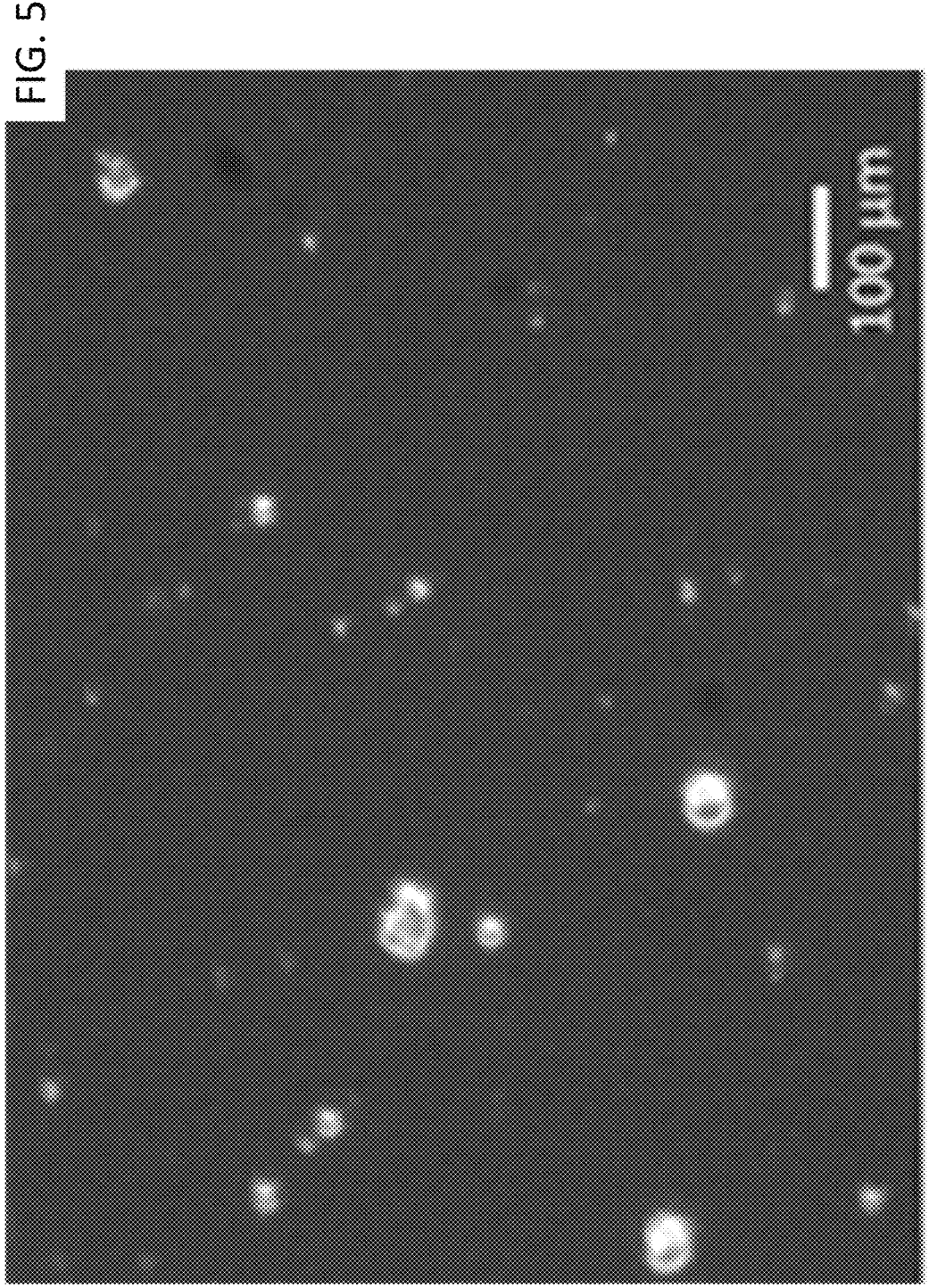
FIG. 5 is a top-down view of an example of QDs in a planarizing coating over a silicon-based ROIC, according to an embodiment of the present disclosure.

FIG. 5 is a top-down view of an example of QDs in a planarizing coating over a silicon-based ROIC, according to an embodiment of the present disclosure. Here, the QDs aggregate in a planarizing coating on silicon (or a silicon-based device, such as an IC having silicon-based structures below and interconnected by metal layers above). Other embodiments may be implemented with other semiconductor materials that may or may not include silicon, such as germanium or III-V materials such as indium gallium arsenide (InGaAs). In any such cases, aggregates of any appropriate size or distribution of sizes can be achieved to provide the inhomogeneity such that no two collections of such QD aggregates are the same (and by extension, no two ROIC readouts of the electrical capacitances are the same).

For example, in FIG. 5, QD aggregates whose sizes span more than two orders of magnitude provide inhomogeneity.

Several techniques are available to interrogate the capacitor matrix, to determine the values of the capacitances in the corresponding array of sensors that make up the unique (and identifying) combination of measurements that distinguishes one PUF from another. For example, in some embodiments, the elements (e.g., sensors) can be addressed individually and I=C(dV/dt) techniques—e.g., I represents electric current (as a function of time), V represents voltage (as a function of time), C represents capacitance, and dV/dt represents the derivative of the voltage with respect to time—used to determine the low frequency capacitance map.

In other embodiments, radio frequency (RF) techniques can be employed to add the frequency dimension to map the PUF matrix. For example, in one embodiment, RF is used to interrogate the PUF layer. For instance, the capacitors in the PUF layer can be elements in a filter and give back a unique response when an antenna that is probed with RF signals uses the PUF layer as a filter, sending the probed RF signals through different capacitors of the PUF layer to generate the unique response.

Figure 6:
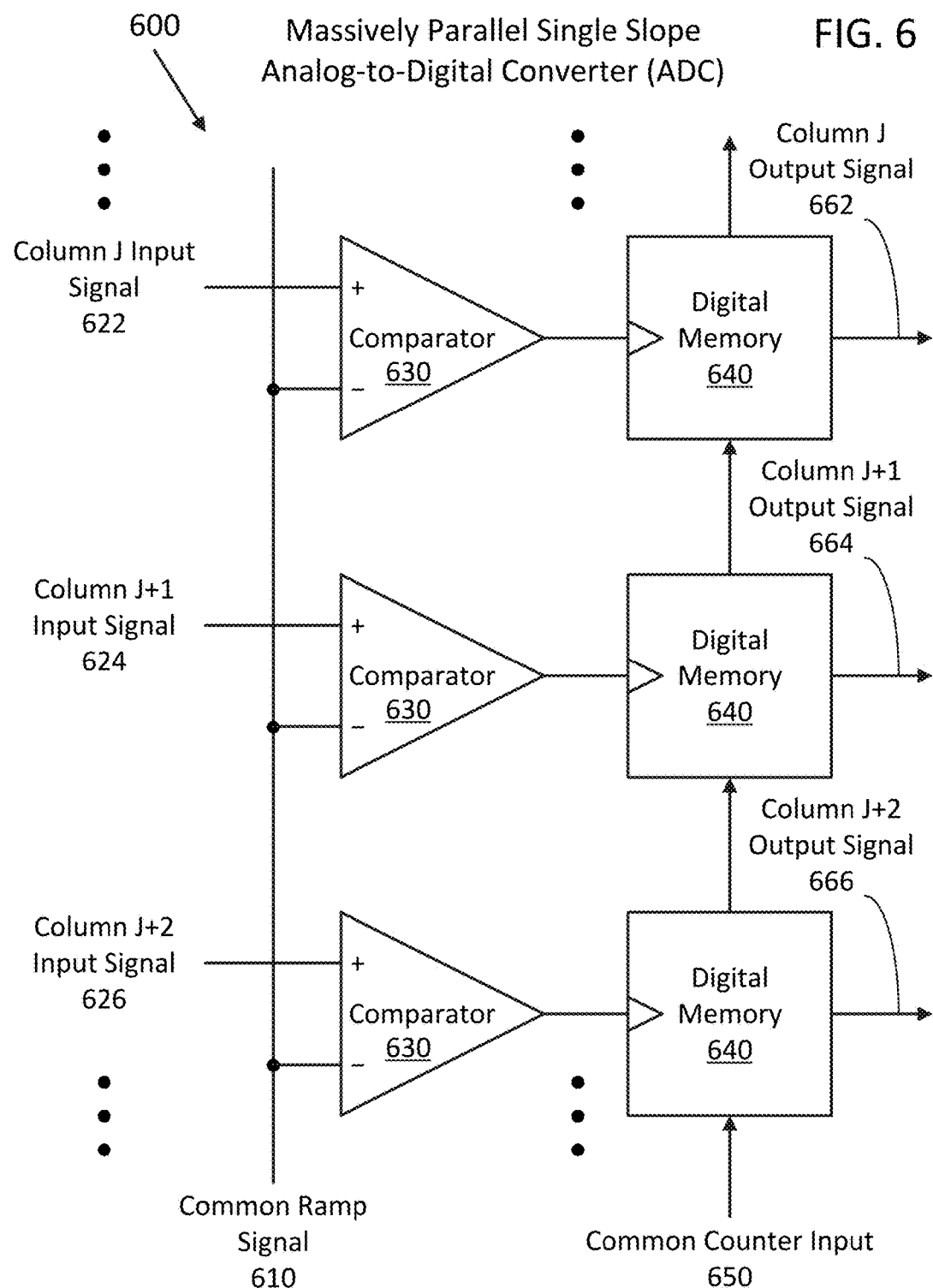
FIG. 6 is a circuit view of an example parallel analog-to-digital converter (ADC) for converting an analog readout of a PUF device to a digital equivalent for uniquely identifying that PUF device, according to an embodiment of the present disclosure.

FIG. 6 is a circuit view of an example parallel analog-to-digital converter (ADC) 600 for converting an analog readout of a PUF device to a digital equivalent for uniquely identifying that PUF device, according to an embodiment of the present disclosure. In the ADC 600 of FIG. 6, the ROIC array columns are read in parallel one row at a time. An example application for such ROIC circuitry is imaging sensors, such as a focal plane array application. In another embodiment, the ROIC array rows are read in parallel one column at a time, the ADC being configured to process the ROIC array rows in parallel one column at a time.

In further detail, the multi-channel ADC 600 is designed into the chip (e.g., the PUF device) to receive the processed sampled capacitance signals for the PUF map. To offload the map, output signals (e.g., 14-bit output signals) for each of the ROIC array columns are read in parallel (e.g., the signals for column 1, column 2, . . . , column J 622, column J+1 624, column J+2 626, . . . are read in parallel) for each row and driven off chip with low voltage differential signal (LVDS) buffers (e.g., comparators 630). For example, the ADC 600 can be a massively parallel single-slope ADC 600 for reading an entire row of data from the ROIC array at a time. In one embodiment, each column of the ROIC array has one of its row signals read by a separate column ADC (including a comparator 630 and digital memory 640). Each column ADC includes a sensitive high-gain input stage 630 to act as a comparator between the input signal (e.g., column J input signal 622, column J+1 input signal 624, and column J+2 input signal 626) and a common linear ramp signal 610. The ramp signal 610 starts at a minimum capacitance value (such as a minimum analog value) and increments (e.g., increments linearly or by steps) to a maximum capacitance value (such as a maximum analog value).

Meanwhile (e.g., concurrently, in synchronization, or the like), a common counter input 650 increments starting at 0 (for example, a minimum digital value) and increments (e.g., increments linearly, such as sequentially) to a maximum value (for example, a maximum digital value). In one embodiment, the common counter input is an unsigned 14-bit counter that increments from 0 to $2^{14}-1$ by 1 in synchronization with the common ramp signal 610. When the ramp signal 610 crosses the input signal level for a particular column input signal, the corresponding comparator 630 triggers up to 14 latches in the corresponding digital memory 640 to capture the time code (e.g., current value of the common counter input 650) of the event.

Put another way, the time codes (e.g., digital signals) are produced by a digital counter 650 in synchronization with the ramp signal 610. The latches are then read out to complete the ADC conversion cycle (e.g., the column J input signal 622 (analog) is converted into a corresponding column J output signal 662 (digital), and similarly for the column J+1 input signal 624 being converted into the column J+1 output signal 664, the column J+2 input signal 626 being converted into the column J+2 output signal 666, and so on). Many such ADC elements can all operate in parallel to produce a true multi-channel ADC 600. In one embodiment, the conversion times (e.g., time for the ramp signal 610 to increment through all the analog signal values and the counter input 650 to increment through all the digital signal values) is 10 microseconds (10 μs), which provides for 100 kilohertz (KHz) sampling rates.

Figure 7:
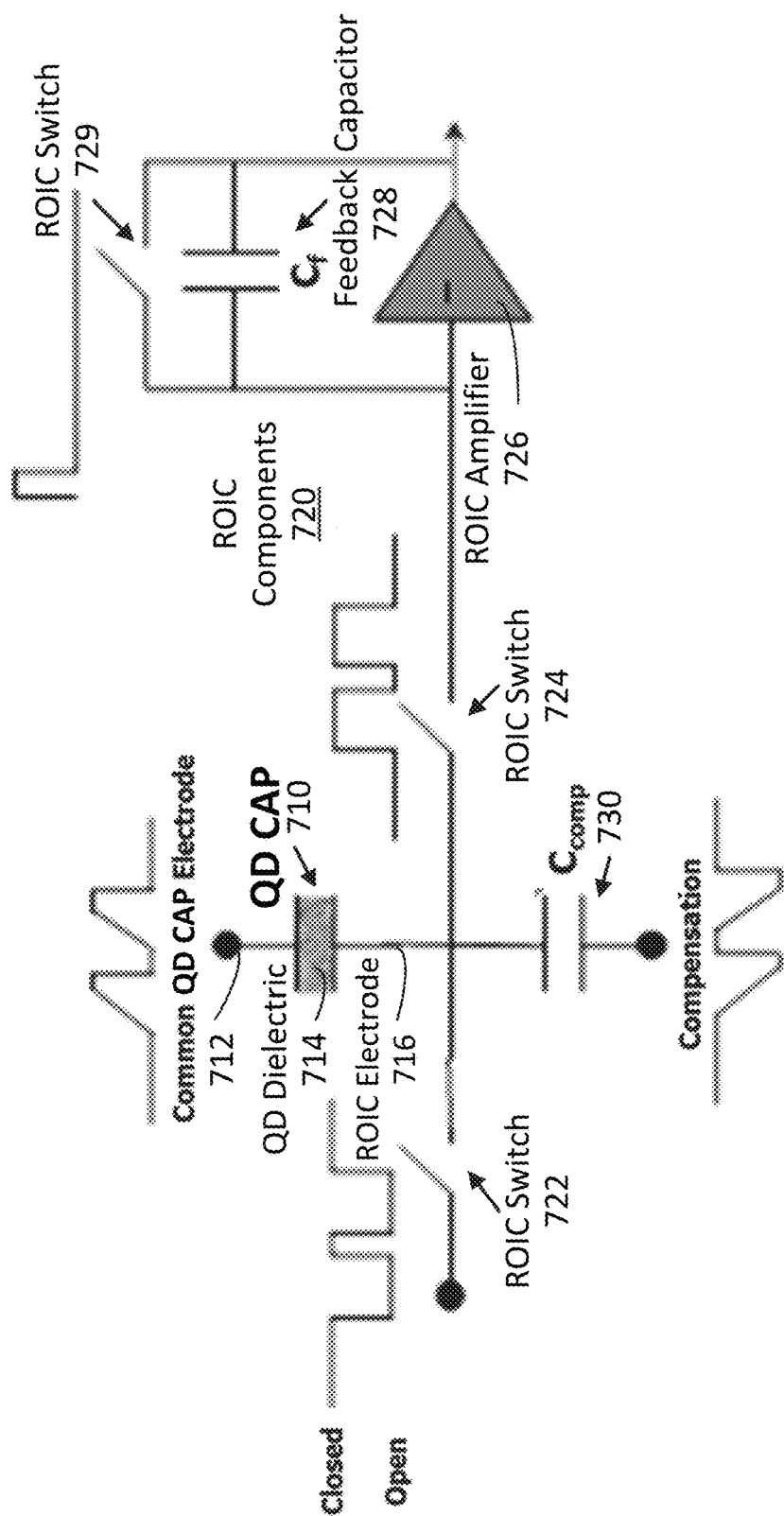
FIG. 7 is a circuit view of an example portion of a PUF device including a QD-based capacitor and associated ROIC components, according to an embodiment of the present disclosure.

FIG. 7 is a circuit view of an example portion 700 of a PUF device including a QD-based capacitor 710 and associated ROIC components 720, according to an embodiment of the present disclosure. The QD capacitor 710 includes a common electrode 712, a ROIC electrode 716, and a QD dielectric layer 714 separating the common electrode 712 from the ROIC electrode 716. The QD dielectric layer 714 can include a composite material including aggregated QDs and a polymer matrix. An optional compensation capacitor 730 can be provided, for example, to improve signal to noise ratio, such as by canceling out base capacitance measurements (e.g., capacitance measurements obtained at locations of the QD dielectric 714 where no QD aggregates are present).

The ROIC components 720 include switches 722 and 724 (e.g., driven by opposite signals) to control initializing (such as charging) the QD capacitor 710 (and compensation capacitor 730, if present) and reading out the QD capacitor (and compensation capacitor 730, if present), respectively, and an amplifier 726 (such as a capacitive transimpedance amplifier) with an associated feedback capacitor 728 and switch 729. For instance, the capacitive transimpedance amplifier 726 can amplify the charge of the junction between the QD capacitor 710 and the compensation capacitor 730.

Figure 8:
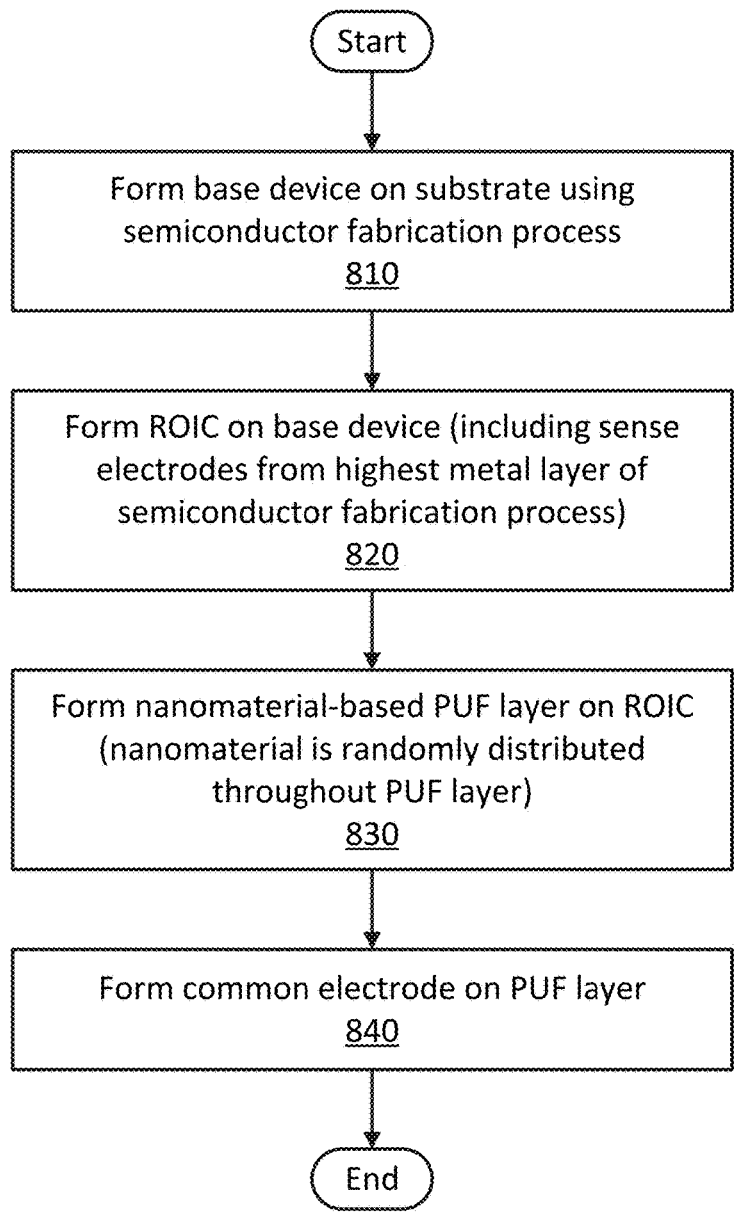
FIG. 8 is an example method of fabricating a nanomaterial-based physically unclonable function (PUF) device, according to an embodiment of the present disclosure.
Figure 9:
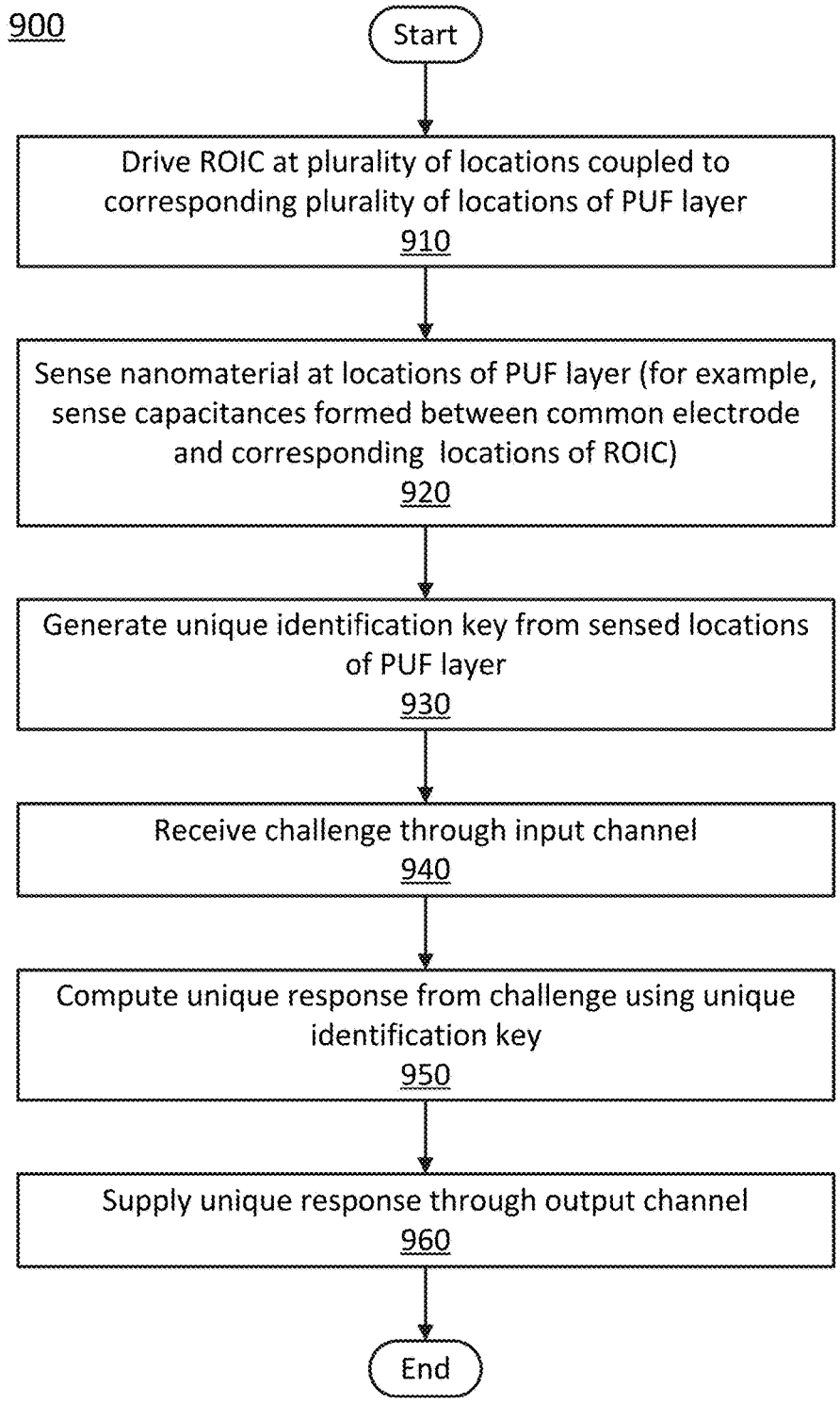
FIG. 9 is an example method of using a physically unclonable function (PUF) device, according to an embodiment of the present disclosure.

FIG. 8 is an example method 800 of fabricating a nanomaterial-based physically unclonable function (PUF) device, according to an embodiment of the present disclosure. FIG. 9 is an example method 900 of using a physically unclonable function (PUF) device, according to an embodiment of the present disclosure. While the methods described herein may appear to have a certain order to their operations, other embodiments are not necessarily so limited. Accordingly, the order of the operations can be varied between embodiments, as would be apparent in light of this disclosure. The methods of FIGS. 8-9 may be implemented, for example, using the structures of FIGS. 1-7.

Method 800 includes forming 810 a base device (such as base device 120) on a substrate (such as substrate 110), forming 820 a readout integrated circuit (ROIC, such as ROIC 130) on the base device, forming 830 a nanomaterial-based PUF layer (such as PUF layer 140) on the ROIC, and forming 840 a common electrode (such as common electrode 150) on the PUF layer. The nanomaterial is randomly distributed (e.g., in no apparent pattern or order) throughout the PUF layer. In one or more embodiments, the forming of the PUF layer includes aggregating quantum dots (QDs) as the nanomaterial for the PUF layer. In one such embodiment, the aggregating of the QDs includes aggregating the QDs such that sizes of the aggregated QDs are randomly distributed across the PUF layer and span more than two orders of magnitude (e.g., over 100 times, such as over 100 times in volume, surface area, cross-sectional area, or longest linear dimension) in variation. In one embodiment, the forming of the PUF layer includes spin coating the nanomaterial in a polymer matrix on the ROIC.

In some embodiments, method 800 is further used to form a uniquely identifying semiconductor device using a semiconductor fabrication process to fabricate the PUF device according to method 800, with the base device being the semiconductor device. The ROIC is configured to sense the nanomaterial at a plurality of locations of the PUF layer and to generate a unique identification key from the sensing of the nanomaterial at the locations. The locations have corresponding random concentrations (e.g., no apparent correlation from one location to another) of the nanomaterial in a thickness direction of the PUF layer. In one such embodiment, the forming of the ROIC includes forming sense electrodes (such as row or column electrodes making up an array of sense electrodes) from a highest metal layer of the semiconductor fabrication process. In one such embodiment, the semiconductor fabrication process is a complementary metal oxide semiconductor (CMOS) fabrication process.

Method 900 is directed to using a PUF device (such as PUF device 100). The PUF device includes a nanomaterial-based PUF layer (such as PUF layer 140) coupled to a readout integrated circuit (ROIC, such as ROIC 130). The nanomaterial is randomly distributed throughout the PUF layer. The method includes driving 910 the ROIC at a plurality of locations (such as a grid of row and column sense electrodes that cross each other) coupled to a corresponding plurality of locations of the PUF layer, sensing 920 the nanomaterial at the locations of the PUF layer, and generating 930 a unique identification key from the sensed locations of the PUF layer. In some embodiments, the sensing of the nanomaterial includes sensing capacitances formed between a common electrode and the corresponding locations of the ROIC, the locations of the PUF layer are between the common electrode and the corresponding locations of the ROIC, and the sensed capacitances are randomly distributed (such as no apparent correlation between one capacitance and another) among the locations of the PUF layer.

In one such embodiment, the ROIC includes rows and columns of sense electrodes crossing each other at the corresponding locations of the ROIC, and a parallel analog-to-digital converter (ADC) configured to concurrently convert all the sensed capacitances corresponding to one of the rows or one of the columns. The sensing of the capacitances further includes concurrently sensing the capacitances corresponding to the one of the rows or one of the columns, and concurrently converting the concurrently sensed capacitances using the parallel ADC.

In one embodiment of method 900, a method of decryption using the PUF device according to method 900 is provided. The PUF device is part of a signal processing device configured to generate a private key (such as a private encryption key, known only to the signal processing device) from the unique identification key, and to generate a public key (such as a public encryption key, known to any number of devices outside the signal processing device) from the generated private key. The method includes using the private key to decrypt a message (such as a message supplied by a device outside the signal processing device but that knows the public encryption key) encrypted with the public key.

In another embodiment of method 900, a method of identification using the PUF device according to method 900 is provided. The PUF device includes an input channel (e.g., software or hardware channel, such as a set of input taps) to receive a challenge (such as a number or string, which can include a predetermined number or string) and an output channel (e.g., software or hardware channel, such as a set of output taps) to supply a corresponding unique response (such as an encrypted number or string, which can include a predetermined encrypted number or string) to the challenge based on the unique identification key. The method includes receiving 940 the challenge through the input channel, computing 950 the unique response from the challenge using the unique identification key, and supplying 960 the unique response through the output channel.

Figure 10:
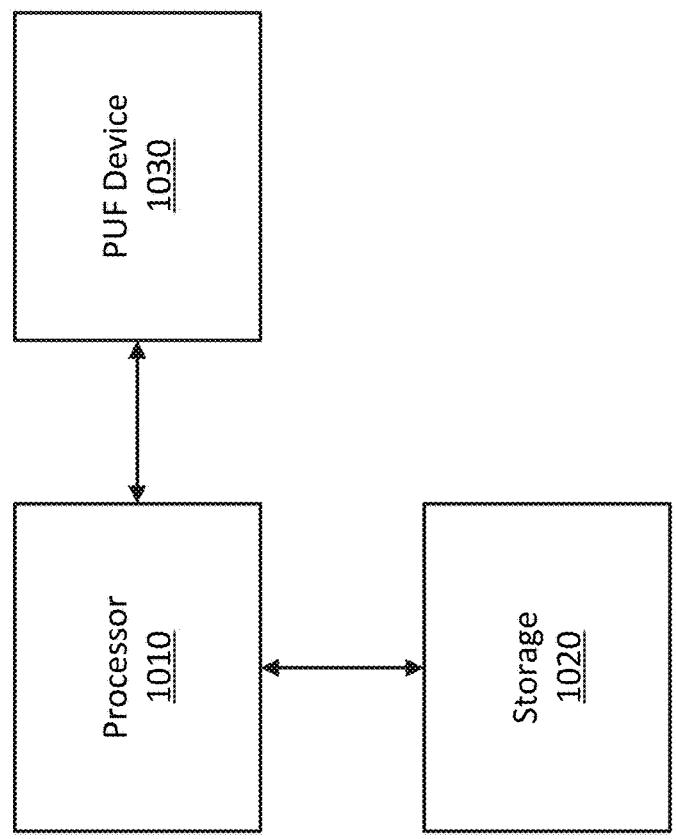
FIG. 10 is a block diagram of a system with an integrated PUF device, according to an embodiment of the present disclosure.

FIG. 10 is a block diagram of a system 1000 with an integrated PUF device 1030, according to an embodiment of the present disclosure. The system 1000 includes a processor 1010 (such as a microprocessor, field-programmable gate array (FPGA), complex programmable logic device (CPLD), system on a chip (SOC), or the like) for performing computing tasks, and a storage device 1020 (such as a disk drive, a sold-state drive, a flash drive, a removable media drive, to name a few) for storage data, instructions, and the like, and a PUF device 1030 for providing unique identification, authentication, decryption, or other PUF application. For example, the system 1000 could be used to implement method 900 described above. In one embodiment, storage 1020 contains responses to challenges that can be posed to PUF device 1030 by the processor 1010, to which the PUF device 1030 will provide the unique responses. In another embodiment, PUF device 1030 generates a unique private decryption key and supplies a corresponding public encryption key to processor 1010, which in turn supplies the public key to external devices that want to communicate securely with processor 1010. The external devices encrypt their data using the public key and supply their data to processor 1010, which processor 1010 then forwards to the PUF device 1030 for secure decryption using the unique private key generated by the PUF device 1030.

In some embodiments, quantum dot-based physically unclonable functions (PUFs) are used for component identification, encryption, and anti-tamper applications. In some embodiments, quantum dots (QDs) are used for PUF, measuring the change in capacitance of the QDs, using a multi-dimensional PUF approach based on 2-D spatial distribution of the QDs, with random localized capacitance variations, in a low cost, simple, CMOS compatible process. Such PUFs can be key to identifying counterfeit parts or tampered parts, and ensure the integrity of the supply chain as compromised electronic components may lead to industrial or intelligence espionage, unreliable systems, and even potential loss of life. In some other embodiments, the capacitances could be coupled to ring oscillators (ROs), such that the resulting RO frequencies are dependent on the nanomaterial-based capacitances. In this fashion, a digital PUF can be realized using much of the firmware already developed for RO-based PUFs.

Further Example Embodiments

The following examples pertain to further embodiments, from which numerous permutations and configurations will be apparent.

Example 1 is a physically unclonable function (PUF) device including: a readout integrated circuit (ROIC); a nanomaterial-based PUF layer on the ROIC, the nanomaterial being randomly distributed throughout the PUF layer; and a common electrode on the PUF layer. In some embodiments, the nanomaterial includes nanoparticles. In some embodiments, the nanomaterial includes aggregated quantum dots (QDs). In some such embodiments, the nanomaterial includes cadmium selenide (CdSe), cadmium sulfide (CdS), zinc sulfide (ZnS), zinc selenide (ZnSe), mercury telluride (HgTe), indium phosphide (InP), gallium arsenide (GaAs, lead sulfide (PbS), lead selenide (PbSe), or lead telluride (PbTe). In some such embodiments, the nanomaterial further includes metal nanoparticles, carbon nanotubes, or nanoparticles of dielectric materials. In some embodiments, the ROIC is configured to sense the nanomaterial at a plurality of locations of the PUF layer, the locations having corresponding random concentrations of the nanomaterial in a thickness direction of the PUF layer. In some such embodiments, the ROIC is further configured to generate a unique identification key from the sensing of the nanomaterial at the locations. In some such embodiments, the PUF device further includes an input channel to receive a challenge and an output channel to supply a corresponding unique response to the challenge based on the unique identification key. In some such embodiments, the ROIC senses the nanomaterial by sensing corresponding capacitances, resistances, or impedances of the locations formed between the ROIC and the common electrode, the sensed capacitances, resistances, or impedances being randomly distributed among the locations. In some embodiments, the ROIC includes rows and columns of sense electrodes crossing each other at positions corresponding to the locations of the PUF layer, and a parallel analog-to-digital converter (ADC) configured to concurrently convert all the nanomaterial sensings corresponding to one of the rows or one of the columns.

Example 2 is a method of fabricating a physically unclonable function (PUF) device, the method including: forming a readout integrated circuit (ROIC); forming a nanomaterial-based PUF layer on the ROIC, the nanomaterial being randomly distributed throughout the PUF layer; and forming a common electrode on the PUF layer. In some embodiments, the forming of the PUF layer includes aggregating quantum dots (QDs) as the nanomaterial for the PUF layer. In some embodiments, the aggregating of the QDs includes aggregating the QDs such that sizes of the aggregated QDs are randomly distributed across the PUF layer and span more than two orders of magnitude in variation. In some embodiments, the forming of the PUF layer includes spin coating the nanomaterial in a polymer matrix on the ROIC. In some embodiments, a method of forming a uniquely identified semiconductor device includes the method of Example 2, with the ROIC being configured to: sense the nanomaterial at a plurality of locations of the PUF layer, the locations having corresponding random concentrations of the nanomaterial in a thickness direction of the PUF layer; and generate a unique identification key from the sensing of the nanomaterial at the locations, where the forming of the ROIC includes forming sense electrodes from a highest metal layer of a semiconductor fabrication process.

Example 3 is a method of using a physically unclonable function (PUF) device including a nanomaterial-based PUF layer coupled to a readout integrated circuit (ROIC), the nanomaterial being randomly distributed throughout the PUF layer, the method including: driving the ROIC at a plurality of locations coupled to a corresponding plurality of locations of the PUF layer; sensing the nanomaterial at the locations of the PUF layer; and generating a unique identification key from the sensed locations of the PUF layer. In some embodiments, the sensing of the nanomaterial includes sensing capacitances, resistances, or impedances formed between a common electrode and corresponding said locations of the ROIC, the locations of the PUF layer are between the common electrode and the corresponding locations of the ROIC, and the sensed capacitances, resistances, or impedances are randomly distributed among the locations of the PUF layer. In some embodiments, the ROIC includes rows and columns of sense electrodes crossing each other at the corresponding locations of the ROIC, and a parallel analog-to-digital converter (ADC) configured to concurrently convert all the sensed capacitances, resistances, or impedances corresponding to one of the rows or one of the columns, the sensing of the capacitances, resistances, or impedances further including concurrently sensing the capacitances, resistances, or impedances corresponding to the one of the rows or one of the columns, and concurrently converting the concurrently sensed capacitances, resistances, or impedances using the parallel ADC. In some embodiments, a method of decryption using the PUF device according to the method of Example 3 is provided, the PUF device being part of a signal processing device configured to generate a private key from the unique identification key, and to generate a public key from the generated private key, the method including using the private key to decrypt a message encrypted with the public key. In some embodiments, a method of identification using the PUF device according to Example 3 is provided, the PUF device including an input channel to receive a challenge and an output channel to supply a corresponding unique response to the challenge based on the unique identification key, the method including receiving the challenge through the input channel, computing the unique response from the challenge using the unique identification key, and supplying the unique response through the output channel.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. In addition, various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A physically unclonable function (PUF) device comprising:
a readout integrated circuit (ROIC);
a nanomaterial-based PUF layer on the ROIC, the nanomaterial being randomly distributed throughout the PUF layer, wherein the ROIC is configured to sense the nanomaterial at a plurality of locations of the PUF layer, the locations having corresponding random concentrations of the nanomaterial in a thickness direction of the PUF layer; and
a common electrode on the PUF layer.

2. The PUF device of claim 1, wherein the nanomaterial comprises nanoparticles.

3. The PUF device of claim 1, wherein the nanomaterial comprises aggregated quantum dots (QDs).

4. The PUF device of claim 1, wherein the nanomaterial comprises cadmium selenide (CdSe), cadmium sulfide (CdS), zinc sulfide (ZnS), zinc selenide (ZnSe), mercury telluride (HgTe), indium phosphide (InP), gallium arsenide (GaAs, lead sulfide (PbS), lead selenide (PbSe), or lead telluride (PbTe).

5. The PUF device of claim 1, wherein the nanomaterial further comprises metal nanoparticles, carbon nanotubes, or nanoparticles of dielectric materials.

6. The PUF device of claim 1, wherein the ROIC is further configured to generate a unique identification key from the sensing of the nanomaterial at the locations.

7. The PUF device of claim 6, further comprising an input channel to receive a challenge and an output channel to supply a corresponding unique response to the challenge based on the unique identification key.

8. The PUF device of claim 1, wherein the ROIC senses the nanomaterial by sensing corresponding capacitances, resistances, or impedances of the locations formed between the ROIC and the common electrode, the sensed capacitances, resistances, or impedances being randomly distributed among the locations.

9. The PUF device of claim 1, wherein the ROIC comprises rows and columns of sense electrodes crossing each other at positions corresponding to the locations of the PUF layer, and a parallel analog-to-digital converter (ADC) configured to concurrently convert all the nanomaterial sensings corresponding to one of the rows or one of the columns.

10. A method of fabricating a physically unclonable function (PUF) device, the method comprising:
   forming a readout integrated circuit (ROIC);
   forming a nanomaterial-based PUF layer on the ROIC, wherein the forming of the PUF layer comprises spin coating the nanomaterial in a polymer matrix on the ROIC, and the nanomaterial being randomly distributed throughout the PUF layer; and
   forming a common electrode on the PUF layer.

11. The method of claim 10, wherein the forming of the PUF layer comprises aggregating quantum dots (QDs) as the nanomaterial for the PUF layer.

12. The method of claim 11, wherein the aggregating of the QDs comprises aggregating the QDs such that sizes of the aggregated QDs are randomly distributed across the PUF layer and span more than two orders of magnitude in variation.

13. A method of forming a uniquely identified semiconductor device, the method comprising the method of claim 10, the ROIC being configured to:
   sense the nanomaterial at a plurality of locations of the PUF layer, the locations having corresponding random concentrations of the nanomaterial in a thickness direction of the PUF layer; and
   generate a unique identification key from the sensing of the nanomaterial at the locations,
   wherein the forming of the ROIC comprises forming sense electrodes from a highest metal layer of a semiconductor fabrication process.

14. A method of using a physically unclonable function (PUF) device comprising a nanomaterial-based PUF layer coupled to a readout integrated circuit (ROIC), the nanomaterial being randomly distributed throughout the PUF layer, the method comprising:
   driving the ROIC at a plurality of locations coupled to a corresponding plurality of locations of the PUF layer;
   sensing the nanomaterial at the locations of the PUF layer, wherein the sensing of the nanomaterial comprises sensing capacitances, resistances, or impedances formed between a common electrode and corresponding said locations of the ROIC, wherein the locations of the PUF layer are between the common electrode and the corresponding locations of the ROIC, and wherein the sensed capacitances, resistances, or impedances are randomly distributed among the locations of the PUF layer; and
   generating a unique identification key from the sensed locations of the PUF layer.

15. The method of claim 14, wherein the ROIC comprises rows and columns of sense electrodes crossing each other at the corresponding locations of the ROIC, and a parallel analog-to-digital converter (ADC) configured to concurrently convert all the sensed capacitances, resistances, or impedances corresponding to one of the rows or one of the columns, the sensing of the capacitances, resistances, or impedances further comprising concurrently sensing the capacitances, resistances, or impedances corresponding to the one of the rows or one of the columns, and concurrently converting the concurrently sensed capacitances, resistances, or impedances using the parallel ADC.

16. A method of decryption using the PUF device according to the method of claim 14, the PUF device being part of a signal processing device configured to generate a private key from the unique identification key, and to generate a public key from the generated private key, the method comprising using the private key to decrypt a message encrypted with the public key.

17. A method of identification using the PUF device according to the method of claim 14, the PUF device comprising an input channel to receive a challenge and an output channel to supply a corresponding unique response to the challenge based on the unique identification key, the method comprising receiving the challenge through the input channel, computing the unique response from the challenge using the unique identification key, and supplying the unique response through the output channel.

* * * * *